United States Patent
Givot

(10) Patent No.: US 10,467,698 B2
(45) Date of Patent: *Nov. 5, 2019

(54) SYSTEM AND METHOD FOR DELAYING AN EXECUTABLE INSTRUCTION THAT WOULD OTHERWISE BE EXECUTABLE IMMEDIATELY UPON ARRIVAL AT AN EXECUTING SYSTEM

(71) Applicant: Chicago Stock Exchange, Inc., Chicago, IL (US)

(72) Inventor: Steven I. Givot, Chicago, IL (US)

(73) Assignee: Chicago Stock Exchange, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/152,208

(22) Filed: Oct. 4, 2018

(65) Prior Publication Data

US 2019/0035026 A1 Jan. 31, 2019

Related U.S. Application Data

(63) Continuation of application No. 15/665,083, filed on Jul. 31, 2017, now Pat. No. 10,127,615, which is a
(Continued)

(51) Int. Cl.
*G06Q 40/00* (2012.01)
*G06Q 40/06* (2012.01)
(Continued)

(52) U.S. Cl.
CPC .......... *G06Q 40/06* (2013.01); *G06F 9/3855* (2013.01); *G06Q 40/04* (2013.01); *G06Q 30/08* (2013.01);
(Continued)

(58) Field of Classification Search
CPC ........ G06Q 40/04; G06Q 40/00; G06Q 40/06; G06Q 30/08
(Continued)

(56) References Cited

U.S. PATENT DOCUMENTS 5,701,516 A 12/1997 Cheng et al.
5,897,624 A * 4/1999 Ramaswamy ..... G06Q 10/0875
705/28

(Continued)

OTHER PUBLICATIONS

TradeTrek securities launches algorithm trading solutions; broker-dealer offers conflict-free algorithm-based trading. (Jan. 18, 2005). Business Wire Retrieved from http://dialog.proquest.com/professional/docview/672151745?accountid=142257 on Jun. 14, 2019 (Year: 2005).*

(Continued)

*Primary Examiner* — Kito R Robinson
(74) *Attorney, Agent, or Firm* — DLA Piper LLP (US)

(57) ABSTRACT

A system and method are provided for intentionally delaying an execution of an executable instruction by determining if a current executable instruction is received from a predefined source for which all executable instructions are to be intentionally delayed. When so, the system sets a sequence time associated with the instruction equal to a receipt time plus a delay time. The system saves the instruction in an intentional delay queue for future execution. When the current executable instruction is received from a source that is not the predefined source, the system determines if a condition for immediate processing of the current executable instruction is present. When so, the system executes the instruction immediately. Otherwise, it performs an intentional delay determination that determines whether the current executable instruction has been intentionally delayed. When the current executable instruction has been intention-
(Continued)

ally delayed, the system executes the instruction immediately.

21 Claims, 15 Drawing Sheets

Related U.S. Application Data continuation-in-part of application No. 15/181,681, filed on Jun. 14, 2016, now abandoned.

(51) Int. Cl.
    *G06F 9/38*         (2018.01)
    *G06Q 40/04*       (2012.01)
    *G06Q 40/02*       (2012.01)
    *G06Q 30/08*       (2012.01)

(52) U.S. Cl.
    CPC ............. *G06Q 40/00* (2013.01); *G06Q 40/02* (2013.01); *G06Q 40/12* (2013.12)

(58) Field of Classification Search
    USPC ...................................................... 705/36 R
    See application file for complete search history.

(56) References Cited

U.S. PATENT DOCUMENTS

| | | | | |
|---|---|---|---|---|
| 6,230,263 B1* | 5/2001 | Ryan | ................... | G06F 9/30079 |
| | | | | 712/227 |
| 6,493,682 B1* | 12/2002 | Horrigan | ................ | G06Q 40/00 |
| | | | | 705/35 |
| 6,618,707 B1* | 9/2003 | Gary | ...................... | G06Q 40/00 |
| | | | | 705/36 R |
| 7,359,877 B2* | 4/2008 | Malitzis | ............... | G06Q 20/102 |
| | | | | 705/35 |
| 8,165,954 B2* | 4/2012 | Waelbroeck | ....... | G06Q 10/0637 |
| | | | | 705/37 |
| 8,924,278 B2* | 12/2014 | Farrell | ................... | G06Q 40/04 |
| | | | | 705/37 |
| 9,203,397 B1* | 12/2015 | Ebeling | .................. | H03K 17/22 |
| 9,881,338 B2* | 1/2018 | Schmitt | .................. | G06Q 40/04 |
| 10,127,615 B1* | 11/2018 | Givot | ..................... | G06Q 40/06 |
| 2006/0287942 A1* | 12/2006 | Anderson | .............. | G06Q 30/08 |
| | | | | 705/37 |
| 2007/0260560 A1* | 11/2007 | Foley | ................. | G06O 30/0283 |
| | | | | 705/400 |
| 2009/0018944 A1* | 1/2009 | De Verdier | ............ | G06Q 40/04 |
| | | | | 705/37 |
| 2009/0099952 A1* | 4/2009 | Wahlberg | ............... | G06Q 40/00 |
| | | | | 705/37 |
| 2012/0005066 A1* | 1/2012 | Keith | ..................... | G05B 15/02 |
| | | | | 705/37 |
| 2012/0330817 A1* | 12/2012 | Brkic | ..................... | G06Q 40/04 |
| | | | | 705/37 |
| 2014/0040098 A1* | 2/2014 | Toffee | .................... | G06Q 40/04 |
| | | | | 705/37 |
| 2014/0172662 A1* | 6/2014 | Weiss | ..................... | G06Q 40/04 |
| | | | | 705/37 |
| 2015/0019397 A1* | 1/2015 | Buck | ....................... | G06Q 40/04 |
| | | | | 705/37 |
| 2015/0066727 A1* | 3/2015 | Wepsic | .................. | G06Q 40/04 |
| | | | | 705/37 |
| 2015/0356679 A1* | 12/2015 | Schmitt | .................. | G06Q 40/06 |
| | | | | 705/37 |

OTHER PUBLICATIONS

TRADESCAPE.com Takes First Step in Launching Tradescape PRO for Powerful Online Stock Trading, Superior Order Execution, Speed and Low Cost. (Dec. 29, 1999). Business Wire Retrieved from https://dialog.proquest.com/professional/docview/669279209? Accounted=142257 on Jun. 5, 2018 (Year: 1999).

* cited by examiner

| 165 | Inbound Message Queue | | |
|---|---|---|---|
| Msg. | ReceiptTime | SequenceTime | Delayed |
| Buy A | 00:00.000 | 00:00.000 | F |
| | | | |

FIG. 1C

| 165 | Inbound Message Queue | | |
|---|---|---|---|
| Msg. | ReceiptTime | SequenceTime | Delayed |
| Buy B | 00:00.010 | 00:00.010 | F |
| | | | |

| 170 | LEAD Queue | | |
|---|---|---|---|
| Msg. | ReceiptTime | SequenceTime | Delayed |
| Buy A | 00:00.000 | 00:00.020 | T |
| | | | |

State E (Present Time = 00:00.019)

FIG. 1D

| 165 | Inbound Message Queue | | |
|---|---|---|---|
| Msg. | ReceiptTime | SequenceTime | Delayed |
| Buy B | 00:00.025 | 00:00.025 | F |
| | | | |

| 170 | LEAD Queue | | |
|---|---|---|---|
| Msg. | ReceiptTime | SequenceTime | Delayed |
| Buy A | 00:00.000 | 00:00.020 | T |
| | | | |

State F (State G) (Present Time = 00:00.030)

FIG. 1E

| 165 | Inbound Message Queue | | |
|---|---|---|---|
| Msg. | ReceiptTime | SequenceTime | Delayed |
| Buy B | 00:00.015 | 00:00.015 | F |
| | | | |

| 170 | LEAD Queue | | |
|---|---|---|---|
| Msg. | ReceiptTime | SequenceTime | Delayed |
| Buy A | 00:00.000 | 00:00.020 | T |
| | | | |

State F (State G) (Present Time = 00:00.030)

FIG. 1F

| 165 | Inbound Message Queue | | |
|---|---|---|---|
| Msg. | ReceiptTime | SequenceTime | Delayed |
| Buy B | 00:00.020 | 00:00.020 | F |
| | | | |

| 170 | LEAD Queue | | |
|---|---|---|---|
| Msg. | ReceiptTime | SequenceTime | Delayed |
| Buy A | 00:00.000 | 00:00.020 | T |
| | | | |

State F (State G) (Present Time = 00:00.030)

FIG. 1G

SYSTEM AND METHOD FOR DELAYING AN EXECUTABLE INSTRUCTION THAT WOULD OTHERWISE BE EXECUTABLE IMMEDIATELY UPON ARRIVAL AT AN EXECUTING SYSTEM

BACKGROUND

The system and method described below relate, in general, to the sequencing/ordering and delay of executable instructions by a processor in a technical system and to respective memory-based queues utilized therein. Specifically, the system and method described below relate to a system and method for delaying an executable instruction that would otherwise be executable immediately upon arrival at an executing system. An implementation of such a system and method, although the invention is not so limited to such an implementation, may be applied to a marketplace for the automated (electronic) trading of a financial instrument and, more particularly, to a system and method of delaying the matching of orders to buy or sell products, for example, financial instruments, in a Matching System which would—in the absence of the system described herein—Take Liquidity immediately upon arrival at a Matching System.

In the past two decades, there has been extraordinary evolution in the automated handling of orders to buy and sell financial instruments including, but not limited to, equity securities, options, government debt securities, corporate debt securities, foreign exchange (currency), futures contracts, and options on futures contracts.

This evolution has typically resulted in manual trading being replaced by automated trading including, but not limited to, matching of buyers and sellers employing sophisticated order types and the use of fully automated Matching Systems to manage the execution priority of these orders, the limitations and restrictions of the terms of each order, and the actual matching of each buyer with each seller based on rules or algorithms which are particular to the regulatory framework in which the Matching System operator works and the rules of the Matching System operator.

As the matching of buyers and sellers became more automated, traditional Liquidity Providers (specialists, market makers, floor traders, OTC traders, etc.) have given way to automated Liquidity Providers who employ electronic systems to place orders to buy and sell securities. Collectively, today's markets rely largely on automated Liquidity Providers to be present to take the other side of a trade when a competitive buyer or seller enters the market.

Starting with an ECN named Island in the 1990s, financial incentives have been provided for electronic market makers. The so-called Maker/Taker model is a common incentive scheme in which the party Taking Liquidity pays a fee to the Matching System operator and the operator pays a portion of that fee to the party Making Liquidity or Providing Liquidity as a financial incentive for the provider to continue doing so. By way of example, a stock exchange may charge a fee of $0.0030 per share matched to the Liquidity Taker and pay $0.0020 per share matched of that to the Liquidity Provider—pocketing the difference of $0.0010 per share matched as its net revenue for operating the Matching System.

Because of intense competition among trading venues, almost any financial instrument that is traded on an electronic Matching System is either traded in multiple trading venues and/or has a derivative relationship with another financial instrument that is electronically traded somewhere. For this reason, the pricing of almost any financial instrument will vary as the price of the same or a related financial instrument changes in some trading venue.

These interrelationships have led to a "speed war" which is fought among market participants. In some instances, a market participant is trying to be the first to recognize the change in the price of a financial instrument in one trading venue and execute a trade in the same financial instrument in another trading venue. In other instances, a market participant is trying to be the first to recognize the change in the price of a financial instrument in one trading venue and execute a trade in a related financial instrument in the same or a different trading venue.

These efforts may be part of a "latency arbitrage" strategy. Latency arbitrage can be described as the practice of exploiting disparities in the pricing of related financial instruments that are being traded in the same or different markets by taking advantage of the time it takes to access and respond to market information. For the purpose of this document, we use the term "latency arbitrageur" to describe a Liquidity Taker who employs a successful latency arbitrage strategy by shooting orders to take liquidity from a contra party victim that has been unable to access and respond to the same market information fast enough to modify the liquidity it is providing.

One consequence of a successful latency arbitrage strategy is that the latency arbitrageur extracts an economic rent from the Liquidity Provider who, although highly automated, does not respond to the same changes in market information as quickly as the latency arbitrageur.

To avoid paying this economic rent to the latency arbitrageur, some Liquidity Providers respond by attempting to beat the latency arbitrageur in the "speed war." However, this can be very costly, and even after committing significant resources to be faster, the Liquidity Provider may not succeed or may succeed for only a period of time after which the latency arbitrageur invests further and becomes faster yet again.

Other responses of the victim Liquidity Provider can range from providing liquidity at less competitive prices, providing less size at the same price, or—in the extreme—ceasing to provide liquidity in an attacked financial instrument altogether. The impact of any of these responses is a reduction of liquidity in the marketplace.

Liquidity Providers are increasingly finding themselves under such latency arbitrageur attacks. The cost of doing nothing requires the Liquidity Provider to do something. The net impact of the range of responses taken has been an overall reduction in liquidity.

At the same time, the maker/taker pricing model is coming under heightened scrutiny by regulators. For example, the US Securities and Exchange Commission is planning to conduct a pilot program to examine the maker/taker model, which may result in these financial incentives for Liquidity Providers in US equity securities being significantly reduced or completely eliminated. This would make it even less attractive to compete as a Liquidity Provider.

SUMMARY

Described herein is an automated system and method which would impose an intentional delay on execution of an executable instruction which would otherwise be executable immediately upon receipt by a system capable of executing the instruction. As described above, such a delay could, for example, provide an opportunity to cancel execution of the instruction if additional subsequently received information might suggest that the executable instruction should not be executed. Whether the instruction is eligible for immediate execution or intentionally delayed may be determined by a set of Delay Criteria which are established to achieve a particular objective in the context of to which this system and method are applied. This system and method can apply broadly. For example, they might apply an intentional delay to a weapon whose output could be canceled after a fire command but prior to execution of the command, or to a news service in which a story submitted by a journalist could be canceled after it has been filed but before it has been published. Other applications may be considered for such a system as well.

In a specific application of such a system, according to an implementation, the automated system and method apply to a financial instrument Matching System which would impose a delay on matching any new order which would take liquidity immediately upon receipt by the Matching System. Since all latency arbitrageur attacks take liquidity from orders already in a Matching System (i.e., "resting orders"), the proposed intentional delay would provide a short window of opportunity for a resting order which is providing liquidity to be cancelled or modified in response to changes in market information.

The systems and methods described below (according to an implementation)—the Liquidity Enhancing Access Delay (LEAD)—levels the playing field between high tech latency arbitrageurs and slower Liquidity Providers, giving those slower Liquidity Providers a reasonable opportunity to adjust the price and quantity of their orders to reflect the most recent market conditions.

Definitions & Acronyms

The following definitions and acronyms are utilized in the following description.

TABLE 1

| | Definitions |
|---|---|
| Cancel Request | A Message which requests the trading venue to cancel an Order previously sent. |
| CurrentMessage (MSCurrentMessage) | The message currently being processed by the Matching System |
| Cxl/Rep Request | A Message which requests the trading venue to cancel an Order previously sent and, based on the state of the previously sent Order may request that a new Order (included in the Cxl/Rep Request) be accepted in its place. |
| Delay Criteria | A set of criteria which is used to determine whether an instruction is eligible processed immediately or placed in the LEAD Queue for an intentional delay. |
| Electronic Communication Network (ECN) | A type of trading venue which includes a network for receiving Messages and a Matching System for handling those Messages including the matching of Orders. |
| FIFOINSERT | FIFOINSERT(Message), which is limited in use for adding a new Message into the LEAD Queue, inserts the new Message based on the time that the new Message is eligible to be released from the LEAD Queue. If the implementation of LEAD permits the LEAD Delay to vary from one Message to another, then the LEAD Queue could easy contain Messages which are not ordered in the sequence by which they should be released from the LEAD Queue (i.e., with the top Message in the LEAD Queue having the soonest release time and the bottom |

TABLE 1-continued

| | Definitions |
|---|---|
| | Message in the LEAD Queue having the latest release time). Use of FIFOINSERT insures that the LEAD Queue is sequences by Message release time and permits the use of FIFOPOP to identify the next Messages in the LEAD Queue which is eligible to be released from the LEAD Queue and to efficiently remove that Message from the LEAD Queue. |
| FIFOPOP | FIFOPOP(Message) removes a Message from the top of a FIFO Queue |
| FIFOPUSH | FIFOPUSH(Message) adds a new Message to the back of a FIFO Queue as the last Message in that queue |
| FIFO Queue | A Message queue which is maintained as a first in-first out queue. |
| Inbound Message Queue (MSInboundQueue) | A FIFO queue of all Messages being sent to the Matching System from outside the Matching System |
| Liquidity Maker | A party to a trade who Makes Liquidity or Provides Liquidity. |
| Liquidity Provider | A party to a trade who Makes Liquidity or Provides Liquidity. |
| Liquidity Taker | A party to a trade who Takes Liquidity. |
| Liquidity Enhancing Access Delay (LEAD) | An intentional delay in order processing despite current possible liquidity which is applied when a set of Delay Criteria is met. |
| LEAD Period | The time between the initial time of arrival of a Message which is placed in the LEAD Queue and the time when a that Message is eligible to be released from the LEAD Queue for processing by the Matching System. |
| LEAD Queue (MSLEADQueue) | A FIFO queue within the Matching System in which a Message that would otherwise be executed immediately upon receipt by the Matching System is placed so that processing by the Matching System can be intentionally delayed during the LEAD Period when the Delay Criteria requires the Message to be intentionally delayed. |
| Make Liquidity | Any Resting Order in the Resting Order Book which is matched as part of a trade is said to Make Liquidity. |
| Matching System | A trading facility through which buy and sell orders in one or more securities are matched. |
| Matching System Dispatcher | The process which receives each Message which has been sent to the Matching System and sequences all such Messages into the FIFO Inbound Message Queue for subsequent processing by the Matching System. The Matching System Dispatcher may be a part of the Matching System or an independent process. |
| Messages | Messages sent to the Matching System which can be executed and can include Orders, Cancel Requests, Cxl/Rep Requests, and other Messages which are may be accepted but are not treated differently as a result of implementing LEAD. |
| MS Current Message (MSCurrentMessage) | The Matching System processes only one Message at a time. This is the Message which the Matching System is currently processing. |
| Order | A Message which is a new order to buy or sell a financial instrument. |
| Provide Liquidity | Same as Make Liquidity. |
| Resting Order | An unmatched Order in the Resting Order Book for a given financial instrument which is available for matching by the Matching System. |
| Resting Order Book | The collection of all Resting Orders. |
| Take Liquidity | Any new inbound Order which is matched against a Resting Order in the Resting Order Book as part of a trade is said to Take Liquidity. |
| Top of Book or TOB( ) | TOB( ) is the order in the Resting Order Book with the highest ranking for immediate execution. |
| Trading Center | The party which operates a Matching System. |

A system and method are described below for implementing a Liquidity Enhancing Access Delay (LEAD) which would intentionally delay the immediate processing of new Messages arriving at a Matching System based on a set of Delay Criteria. For the purpose of this application, an implementation of the system and method are described as applied to trading in financial instruments and employ a set of Delay Criteria which intentionally certain delays immediate execution of certain instructions which would otherwise be fully processed by the Matching System when first received by the Matching System. The figures show both application of a generic set of Delay Criteria and, to amplify how the Delay Criteria might be structured, a set of specific Delay Criteria when applied to trading in financial instruments. The length of the intentional delay imposed is the LEAD Period, which can be either a predetermined fixed or variable amount of time.

The LEAD may be implemented within the framework of a Matching System which includes a network to connect the Trading Center with order senders, a Resting Order Book, an Inbound Message Queue, and an automated process which processes Messages from the Inbound Message Queue against its Resting Order Book.

The LEAD may delay Orders which would Take Liquidity if it were immediately processed by the Matching System. These Orders may be moved to the LEAD Queue subject to release for processing at the end of the LEAD Period to permit other Messages which would not have Taken Liquidity to be processed ahead of the intentionally delayed Order. An Order placed in the LEAD Queue is eligible to be removed from the LEAD Queue when the LEAD Period has passed. However, if other messages arrived prior to the end of the LEAD Period, they may be processed before removing the order from the LEAD Queue.

Whether a given Cancel Request is placed in the LEAD Queue is determined by the Delay Criteria. An exception may be made if the Order to be cancelled is currently in the LEAD Queue. In that instance, to assure proper synchronization of the Order Message and the subsequent Cancel Request for that Order.

Whether a Cxl/Rep Requests is placed in the LEAD Queue is determined by the Delay Criteria. An exception may be made if the Order to be cancelled and replaced is currently in the LEAD Queue, the Cxl/Rep Request will also be placed in the LEAD Queue. This is done to assure proper synchronization of the Order Message and the subsequent Cxl/Rep Request for that Order. When the Matching System processes a Cxl/Rep Request, the Matching System determines what, if any, replacement Order should be processed. If the replacement Order would have Taken Liquidity—in the absence of LEAD—immediately and if the Cxl/Rep Request had not already been moved to the LEAD Queue, then the replacement Order is moved to the LEAD Queue so that it will not Take Liquidity immediately.

Messages other than Orders, Cancel Requests, and Cxl/Rep Requests may be handled as they would have been if LEAD were not implemented.

When the LEAD Queue is empty, the Matching System processes orders in the Inbound Message Queue in FIFO sequence as is known. One or more of those Messages may be moved to the LEAD Queue as described above.

When the LEAD Queue is not empty but the top Message in the LEAD Queue is still subject to the LEAD Delay (i.e., its Message.SequenceTime<CunentTime), the Matching System processes orders in the Inbound Message Queue in FIFO sequence as is known. If there is no Message in the Inbound Message Queue, the Matching System waits for either a new Message to arrive in the Inbound Message Queue (in which case it is processed by the Matching System) or until the top Message in the LEAD Queue is no longer subject to the LEAD Delay (i.e., its Message.SequenceTime≥CurrentTime) in which case it is moved from the LEAD Queue to the Matching System and processed without further delay.

When the LEAD Queue is not empty and the top Message in the LEAD is no longer subject to the LEAD Delay (i.e., its Message.SequenceTime≥CurrentTime), the Matching System may determine whether it should process the top Message in the LEAD Queue. If there is no Message in the Inbound Message Queue, the Matching System immediately removes the top Message from the LEAD Queue and processes it. However, if there is also a Message in the Inbound Message Queue, the Matching System determines whether to process the top Message in the LEAD Queue or the top Message in the Inbound Message Queue. The Matching System does this by comparing the Message.SequenceTime for the top Message in the LEAD Queue with the Message.SequenceTime for the top Message in the Inbound Message Queue. If the former is less than or equal to the latter, the top Message in the LEAD Queue is removed from the LEAD Queue and immediately processed by the Matching System. Otherwise the top Message in the Inbound Message Queue is removed from the LEAD Queue and immediately processed by the Matching System.

Both the Inbound Message Queue and the LEAD Queue are preferably implemented as first-in-first-out (FIFO) queues, but other queue mechanisms that achieve a similar result might be utilized as well.

A method is provided for intentionally delaying an execution of an executable instruction executable by a processor, comprising utilizing the processor to execute programmed instructions for determining if a current executable instructions is received from a predefined source for which all executable instructions are to be delayed, when the current executable instruction is received from a predefined source for which all executable instructions are to be delayed performing a first delay operation comprising setting a sequence time associated with the current executable instruction equal to an executable instruction receipt time associated with the current executable instruction plus a delay time, and performing a second delay operation comprising saving the current executable instruction with the sequence time in a delay queue resident in a memory associated with the processor for future execution, wherein the first delay operation and the second delay operation comprise a delay operation, and when the current executable instructions is received from a source that is not the predefined source determining if a condition for immediate processing of the current executable instruction is present, when the condition for immediate processing of the current executable instruction is present, executing the current executable instruction immediately, and when the condition for immediate processing of the current executable instruction is not present, performing a delay determination that determines whether the current executable instruction has been deliberately delayed, when the current executable instruction has been deliberately delayed, executing the current executable instruction immediately.

A system is provided for delaying an execution of an executable instruction, comprising a processor that is configured to execute the executable instruction, an input at which an executable instruction is received, an inbound message queue configured to hold executable instructions, a delay queue configured to hold other executable instructions, the processor being further configured to execute programmed instructions to determine if a current executable instructions is received from a predefined source for which all executable instructions are to be delayed, when the current executable instructions is received from a predefined source for which all executable instructions are to be delayed perform a first delay operation comprising setting a sequence time associated with the current executable instruction equal to an executable instruction receipt time associated with the current executable instruction plus a delay time, and perform a second delay operation comprising saving the current executable instruction with the sequence time in a delay queue resident in a memory associated with the processor for future execution, wherein the first delay operation and the second delay operation comprise a delay operation, and when the current executable instructions is received from a source that is not the predefined source determine if a condition for immediate processing of the current executable instruction is present, when the condition for immediate processing of the current executable instruction is present, execute the current executable instruction immediately, and when the condition for immediate processing of the current executable instruction is not present, perform a delay determination that determines whether the current executable instruction has been deliberately delayed, and when the current executable instruction has been deliberately delayed, execute the current executable instruction immediately.

As described herein, a message is one possible mechanism that may be used to convey an executable instruction, and an executable instruction is one possible element that a message may contain. The term message may be used herein to convey either the message itself or to be a proxy for the executable instruction that it contains. Similarly, the term executable instruction may be used herein as a proxy for the message that contains it. For example, the phrase "moving a message into the message queue" may also be understood as "moving an executable instruction into the message queue". Similarly, the phrase "moving an executable instruction into the delay queue" may also be understood as "moving a message into the delay queue".

DESCRIPTION OF THE DRAWINGS

For a more complete understanding of the system and method described herein, and for further features and advantages, reference is now made to the following descriptions, taken in conjunction with the accompanying drawings which include:

FIGS. 1C-1G are block diagrams illustrating various queue states;

All drawings have been simplified by omitting various activities which are often found in Matching Systems. One such activity is logging various activities to a file or database to support auditing the processes for proper performance as well as for recovery in the event of a system failure. A second such activity is translating Messages from one format to another. A third such activity is validating the format and contents of a Message. The currently defined Matching System may employ any or all of these activities or systems that support these activities.

DETAILED DESCRIPTION

Figure 1A:
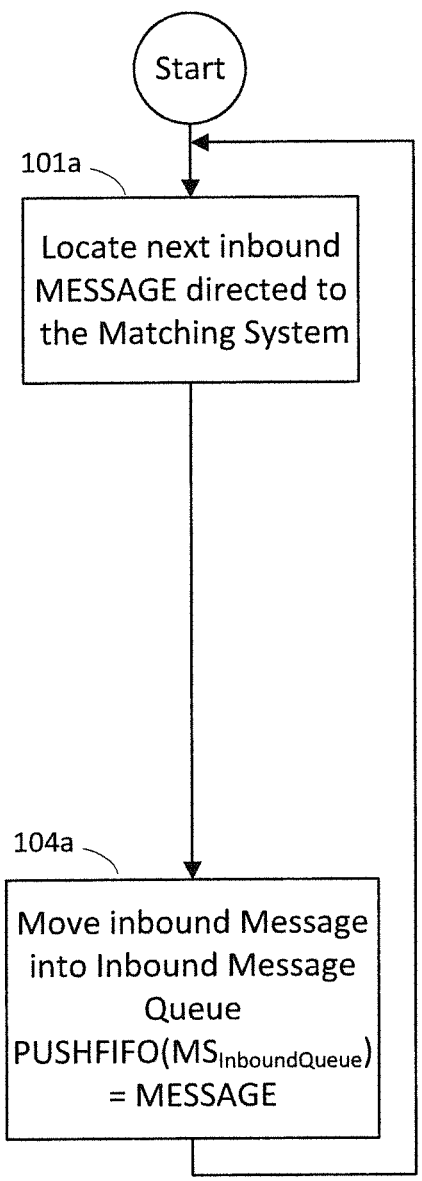
FIG. 1A is a flowchart that shows how a known Matching System Dispatcher which receives Inbound Messages from multiple sources and sequences their arrival in the Matching System is typically organized.

FIG. 1A is a flowchart that illustrates operation of a known Matching System Dispatcher which receives Inbound Messages from multiple sources and sequences their arrival in the Matching System.

Figure 4:
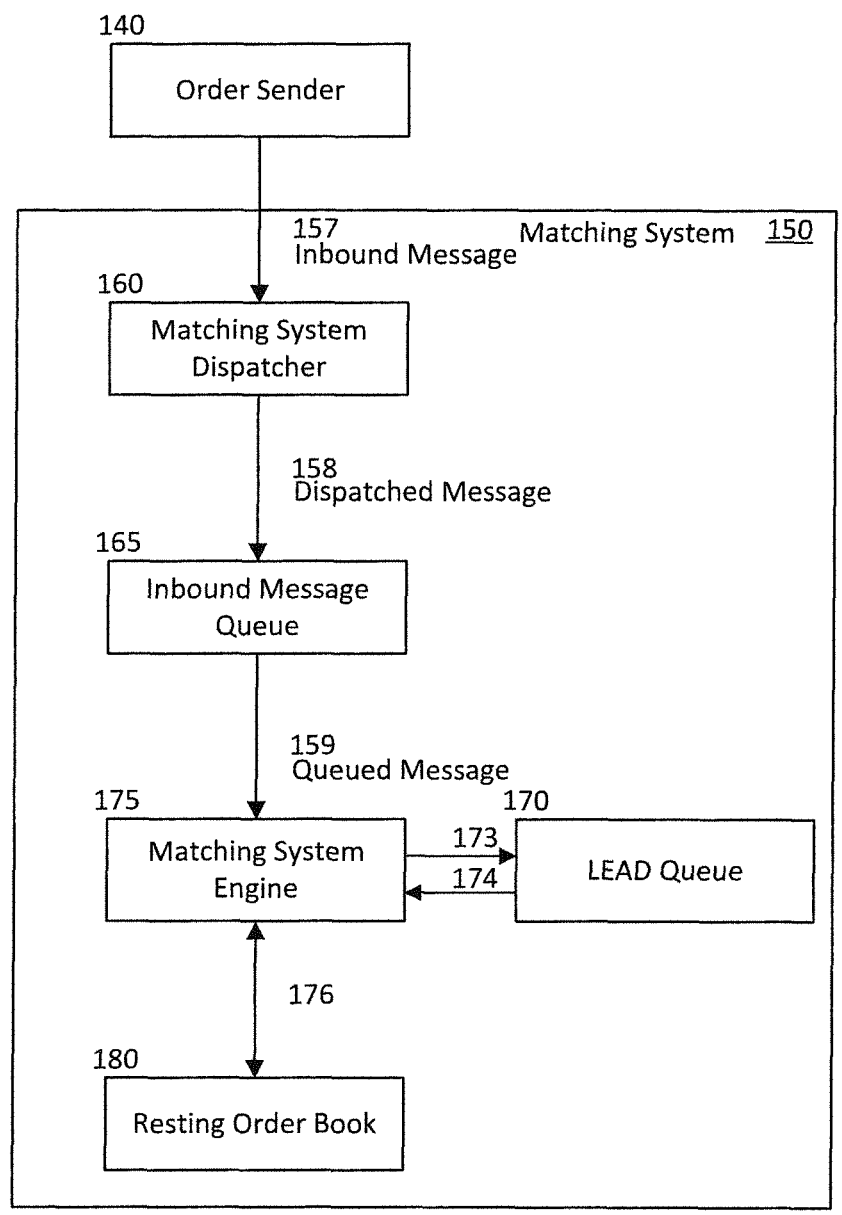
FIG. 4 is a block diagram illustrating the components of a Matching System according to an implementation of the present invention.

FIG. 4 is a block diagram related to FIG. 1A that illustrates system components of a Matching System 150 that are described in conjunction with the flowcharts that describe functional processing routines. An Order Sender 140 sends an order as an Inbound Message 157 to the Matching System 150. At operation 101a, the Matching System Dispatcher 160 locates this next Inbound Message 157 which has been sent to the Matching System 150. This process may involve waiting for the next Inbound Message 157 if one is not immediately present. After the Inbound Message 157 has been received, processing continues at operation 104a.

At operation 104a, the Matching System Dispatcher 160 moves the Inbound Message 157, now a Dispatched Message 158 into a FIFO Inbound Message Queue 165. When this is completed, processing continues at operation 101a where the Matching System Dispatcher locates the next Message.

Figure 1B:
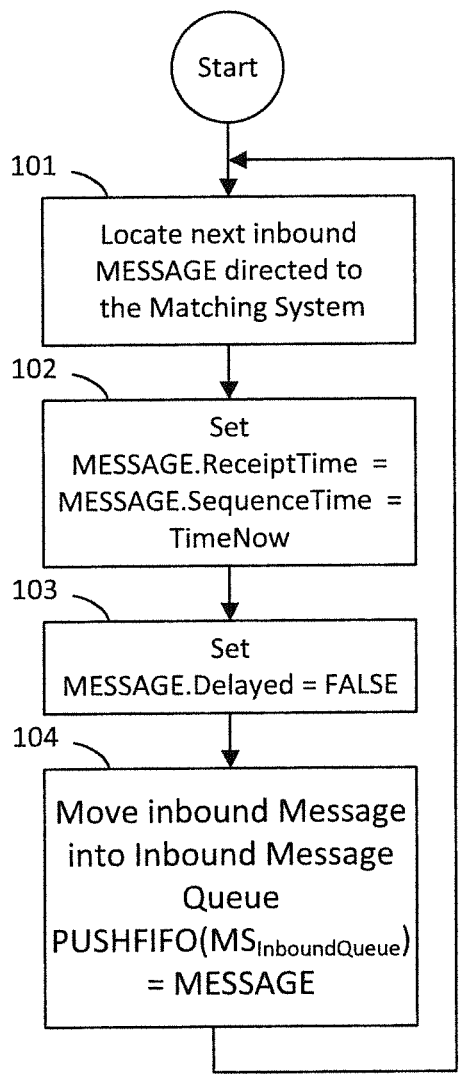
FIG. 1B is a flowchart that shows how a Matching System Dispatcher which receives Inbound Messages from multiple sources and sequences their arrival in the Matching System according to an implementation of the present invention.

FIG. 1B is a flowchart that illustrates an implementation of the invention, utilizing elements of FIG. 4 showing a Matching System 150 that has a Matching System Dispatcher 160 which receives Inbound Messages 157 from multiple Order Senders 155 and sequences their arrival in the Matching System 150.

At operation 101, as was the case in FIG. 1A (101a), the Matching System Dispatcher 160 locates the next Inbound Message 157 which has been sent to the Matching System 150. This process may involve waiting for the next Inbound Message if one is not immediately present. By way of example, the Message is a "Buy A" message (the message would also have additional information about the order, such as the number of shares, a type of order, etc.). After the Message 157 has been received, processing continues at operation 102.

At operation 102, the Matching System Dispatcher 160 may set two values related to the Inbound Message 157. The first value is the Message.ReceiptTime which is set to the current time. By way of example, the Buy A Message.ReceiptTime is set to 00:00.000 (an MM:SS.SS-fraction form is used in this example for the sake of brevity. However, in the real world, a full-time descriptor may be used that uniquely identifies a point in time of the occurrence which may provide granularity at the microsecond or nanosecond level. The ability to handle messages with a granularity at the microsecond or nanosecond level renders the system as technically feasible by use of a high speed processor and precludes a possibility of execution by a human being using solely thought processes). This Message.ReceiptTime should never change over the life of this Message. The second value is SequenceTime which is initially set to the same value as the Message.ReceiptTime. Thus, in the example, the Buy A Message.SequenceTime is set to 00:00.000 as well. If the Inbound Message 157 is subsequently moved to the LEAD Queue 170 (described in more detail below), the Message.SequenceTime determines the first possible time when this Message can be fully processed by the Matching System Engine 175. In an implementation, the Message.SequenceTime is set to be a different value when the message is placed in the LEAD Queue 170. Processing continues at operation 103.

At operation 103, the Matching System Dispatcher 160 may initially set another value, e.g., Delayed, related to the Message to FALSE. The value of Delayed for this Message should remain FALSE unless the Message is moved to the LEAD Queue 170, at which time the value of Delayed should be set to TRUE. This value is used to assure that no Message is placed in the LEAD Queue 170 more than once. Processing continues at operation 104.

At operation 104, the Matching System Dispatcher 160 moves the Dispatched Message 158 into the FIFO Inbound Message Queue 165. When this is completed, processing continues at operation 101 where the Matching System Dispatcher 160 locates the next Message.

As can be seen by comparing FIG. 1A and FIG. 1B, there are two additional operations within the Matching System Dispatcher 160 according to this implementation. These are operations 102 and 103 which provide initial values for Message.ReceiptTime, Message.SequenceTime, and Delayed, which are described in more detail below. FIG. 1C is a block diagram illustrating a state of the Inbound Message Queue 165 after completion of 104.

Figure 2A:
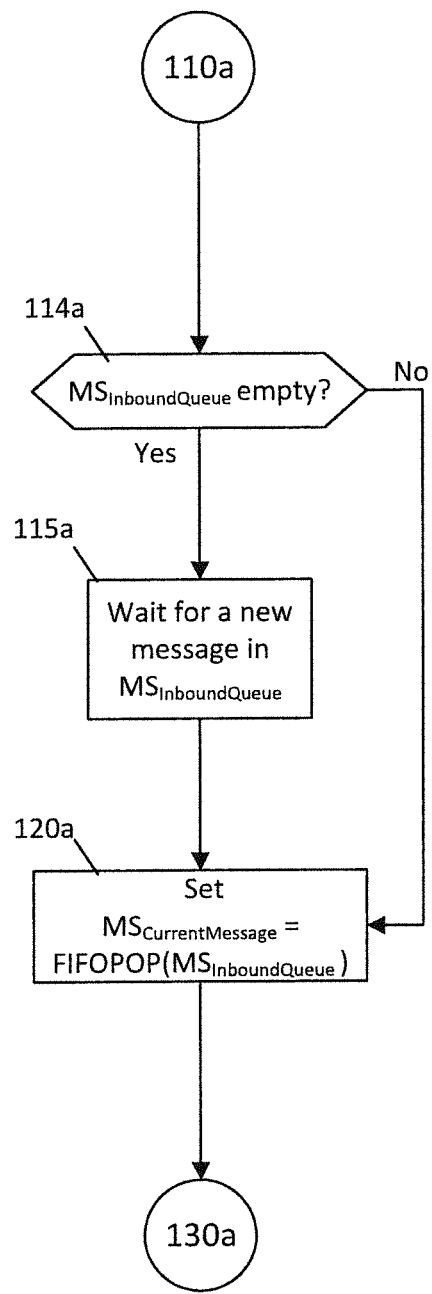
FIG. 2A is a flowchart that shows how a known Matching System is typically organized.

FIG. 2A is a flowchart showing a known process for a Matching System. At operation 114a, the Matching System Engine 175 determines whether the Inbound Message Queue 165 is empty. In this implementation, if there is no Queued Message 159 in the Inbound Message Queue, processing continues at operation 115a. In other implementations, the Matching System Engine 175 might not include operation 114a and, instead, continue to repeat operation 115a until a new Queued Message 159 arrives. If there are one or more Queued Messages 159 in the Inbound Message Queue 165, processing continues at operation 120a.

At operation 115a, the Matching System 150 waits for a new Dispatched Message 158 to arrive at the Inbound Message Queue 165. When a new Dispatched Message 158 arrives, processing continues at operation 120a.

At operation 120a, the Matching System Engine 175 removes the top Queued Message 159 from the Inbound Message Queue 165, POPFIFO(MSInboundQueue), and makes it the current message (MSCurrentMessage).

Figure 2B:
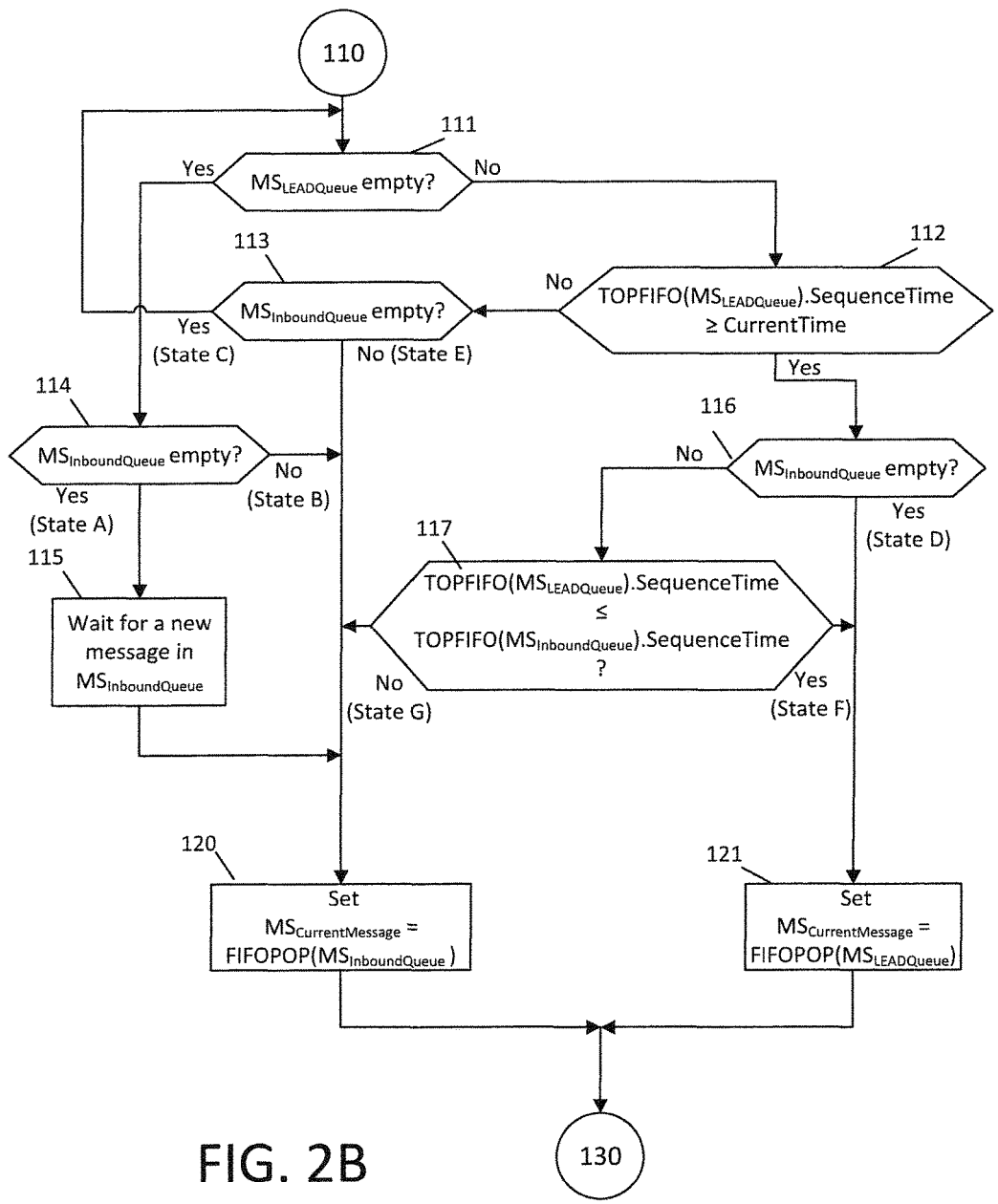
FIG. 2B is a flowchart that shows how a Matching System according to an implementation of the present invention supports proper sequencing of Messages which arrive in the Inbound Message Queue and Messages which are moved to the LEAD Queue to delay their arrival at the Matching System.

FIG. 2B is a flowchart illustrating a Matching System according to an implementation of the invention. This flowchart describes a proper sequencing of Dispatched Messages 158 which arrive in the Inbound Message Queue 165 and Queued Messages 159 which are moved as LEAD Input Messages 173 to the LEAD Queue 170 to delay their execution at the Matching System Engine 175.

At any moment when the Matching System Engine 175 is determining the next Message 157 to process, the state of the Inbound Message Queue 165 and the LEAD Queue 170 should be one and only one of the following:

TABLE 2

Queue States

| STATE | FIG. 2B OPERATION | LEAD QUEUE (170) STATE | INBOUND MESSAGE QUEUE (165) STATE | FIFOTOP (MSLEADQueue). Sequence Time ≥ CurrentTime | FIFOTOP (MSLEADQueue). SequenceTime ≤ FIFOTOP(MSInbound Queue).SequenceTime |
|---|---|---|---|---|---|
| A | 115 | Empty | Empty | N/A | N/A |
| B | 120 | Empty | Not Empty | N/A | N/A |
| C | 111 | Not Empty | Empty | No | N/A |
| D | 121 | Not Empty | Empty | Yes | N/A |
| E | 120 | Not Empty | Not Empty | No | N/A |
| F | 121 | Not Empty | Not Empty | Yes | Yes |
| G | 120 | Not Empty | Not Empty | Yes | No |

At operation 110, the Matching System Engine 175 begins waiting for and then processing Queued Messages 159 in the Inbound Message Queue 165. Processing continues at operation 111.

At operation 111 the Matching System Engine 175 tests whether the LEAD Queue 170 is empty. If the LEAD Queue 170 is empty, then the current state is among {State A or State B}, and processing continues at operation 114. If the LEAD Queue 170 is not empty, then the current state is among {State C, State D, State E, State F, or State G}, and processing continues at operation 112.

At operation 112, the Matching System Engine 175 has determined that there is at least one LEAD Queued Message 174 in the LEAD Queue 170. The Matching System Engine 175 now tests whether the Message.SequenceTime of top LEAD Queued Message 174 in the LEAD Queue (e.g., 00:00.020) has been reached (time equal to) or passed (time greater than) (i.e., the intentional delay has been completed). If so (e.g., the present time is 00:00.020), then the current state is among {State D, State F, or State G}, and processing continues at operation 116. If not (e.g., the current time is 00:00.019), then the top Lead Queued Message 174 in the LEAD Queue 170 cannot be processed by the Matching System Engine 175 at the present time, and the state is among {State C or State E}, and processing continues at operation 113.

At operation 113, the Matching System Engine 175 has determined that the Message.SequenceTime of the top LEAD Queued Message 174 in the LEAD Queue 170 has not been reached or passed (in the example, present time is 00:00.019). If the Inbound Message Queue 165 is empty, the current state is State C, there are no LEAD Queued Messages 174 to process at the present time, and processing continues at operation 111. If the Inbound Message Queue 165 is not empty, then the current state is State E, the top Message in the Inbound Message Queue 165 should be processed by the Matching System Engine 175, and processing continues at operation 120. FIG. 1D is a block diagram illustrating the queues' contents at State E at the example present time of 00:00.019, where, in this instance, Buy A is not ripe to be removed from the LEAD Queue. Therefore, Buy B is processed next.

At operation 114, the Matching System Engine 175 has already determined that the LEAD Queue 170 is empty. The Matching System Engine 175 now tests whether the Inbound Message Queue 165 is also empty. If the Inbound Message Queue 165 is empty, then the current state is State A, there are no Queued Messages 159 for the Matching System Engine 175 to process at the present time, and processing continues at operation 115. If the Inbound Message Queue 165 is not empty, then the current state is State B, the top Queued Message 159 in the Inbound Matching Queue 165 should be processed at the present time, and processing continues at operation 120.

At operation 115, the Matching System 150 is in State A. In this state, both the Inbound Message Queue 165 and the LEAD Queue 170 are empty. Since any Message 157 must arrive at the Inbound Message Queue 165 before it can be moved to the LEAD Queue 170, there is no reason to continuously test the LEAD Queue 170 for messages. The Matching System 150 enters a wait state until a new Dispatched Message 158 is placed in the Inbound Message Queue 165. When this happens, processing of that new Dispatched Message 158 continues at operation 120. In a different implementation, instead of continuing at operation 115, operation 114 may continue processing at operation 111 when in State A. Either achieves the same logical result. This implementation avoids wasting processing time to continuously examine whether the Inbound Message Queue 165 has a new Dispatched Message 158 by entering a wait state.

At operation 116, the Matching System Engine 175 has determined that the top LEAD Queued Message 174 in the LEAD Queue 170 may be processed at the present time. However, the Matching System Engine 175 must now determine whether there exists a Queued Message 159 in the Inbound Message Queue 165 which should be processed before the top LEAD Queued Message 174 in the LEAD Queue. To do so, the Matching System Engine 175 determines whether the Inbound Message Queue 165 is empty. If the Inbound Message Queue 165 is empty, then the current state is State D, the next Message for the Matching System Engine 175 to process is the top LEAD Queued Message 174 in the LEAD Queue, and processing continues at operation 121. If the Inbound Message Queue 165 is not empty, then the Matching System Engine 175 must determine whether to process the top Queued Message 159 in the Inbound Message Queue 165 or the top LEAD Queued Message 174 in the LEAD Queue 170 next, the current state is among (State F and State G), and processing continues at operation 117.

At operation 117, the Matching System Engine 175 has determined that both the Inbound Message Queue 165 and the LEAD Queue 170 have a Message which could be processed by the Matching System Engine 175 at the present time. FIG. 1E illustrates the various states discussed below, and presumes, by way of example, that the present time is 00:00.030.

To determine which to process at the present time, the Matching System Engine 175 compares the Message.SequenceTime value of each of these Messages 159, 174 in the respective queues 165, 170. If the Message.SequenceTime of the top LEAD Queued Message 174 in the LEAD Queue 170 (e.g., 00:00.020) has a time that is earlier than or the same as the Message.SequenceTime of the top Queued Message 159 in the Inbound Message Queue 165 (e.g., 00:00.025), then the top LEAD Queued Message 174 in the LEAD Queue 170 should be processed next, the current state is State F, and processing continues at operation 121.

As shown in FIG. 1F, if the Message.SequenceTime of the top LEAD Queued Message 174 in the LEAD Queue 170 (e.g., 00:00.020) has a time that is later than the Message.SequenceTime of the top Message in the Inbound Message Queue 165 (e.g., 00:00.015), then the top Queued Message 159 in the Inbound Message Queue 165 may be processed next, the current state is State G, and processing continues at operation 120.

As shown in FIG. 1G, the condition when both Message.SequenceTimes are the same, in one implementation, may have the LEAD Queued Message 174 in the LEAD Queue 170 being processed first. In another implementation, the condition when both Message.SequenceTimes are the same, in one embodiment, may have the Queued Message 159 in the Inbound Message Queue 165 being processed first.

At operation 120, the top Queued Message 159 in the Inbound Message Queue 165 is the next Message for the Matching System Engine 175 to process. That Queued Message 159 is removed from the Inbound Message Queue 165 and the Current Message 172 is set to be that Message. Processing of the Current Message 172 continues at operation 130.

At operation 121, the top LEAD Queued Message 174 in the LEAD Queue 170 is the next Message for the Matching System Engine 175 to process. That LEAD Queued Message 174 is removed from the LEAD Queue 170 and the Current Message 172 is set to be that Message. Processing of the Current Message 172 continues at operation 130.

As can be seen by comparing FIG. 2A and FIG. 2B, there may be several additional operations required within the Matching System 150 to determine the next Current Message 172 for the Matching System Engine 175 to process and when the Matching System Engine 175 may process that Message. These are operations 111, 112, 113, 116, 117, and 121. These operations (or their logical equivalent) may be employed according to an implementation of the invention.

Figure 3A:
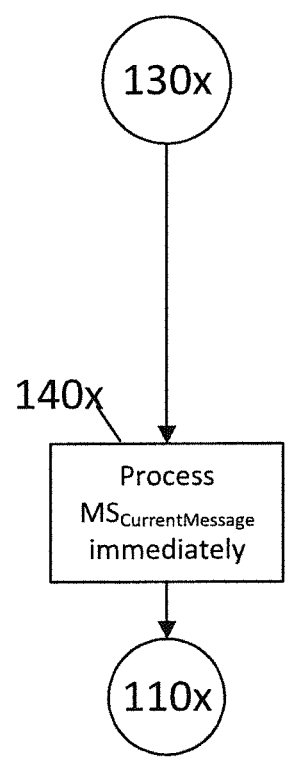
FIG. 3A is a flowchart that shows how a known Matching System is typically organized.

FIG. 3A shows how a known Matching System Engine 175 processes the Current Message 172.

At operation 130x, processing begins after the Current Message 172 has been determined. In a known Matching System Engine 175, for the Current Message 172, no action is required at this point, and processing continues at operation 140x.

At operation 140x, the Matching System Engine 175 performs whatever action the Current Message 172 requires (e.g., execute, cancel, cancel and replace). When the Matching System Engine 175 processing of the Current Message 172 is completed, processing continues at operation 110x.

Figure 3B:
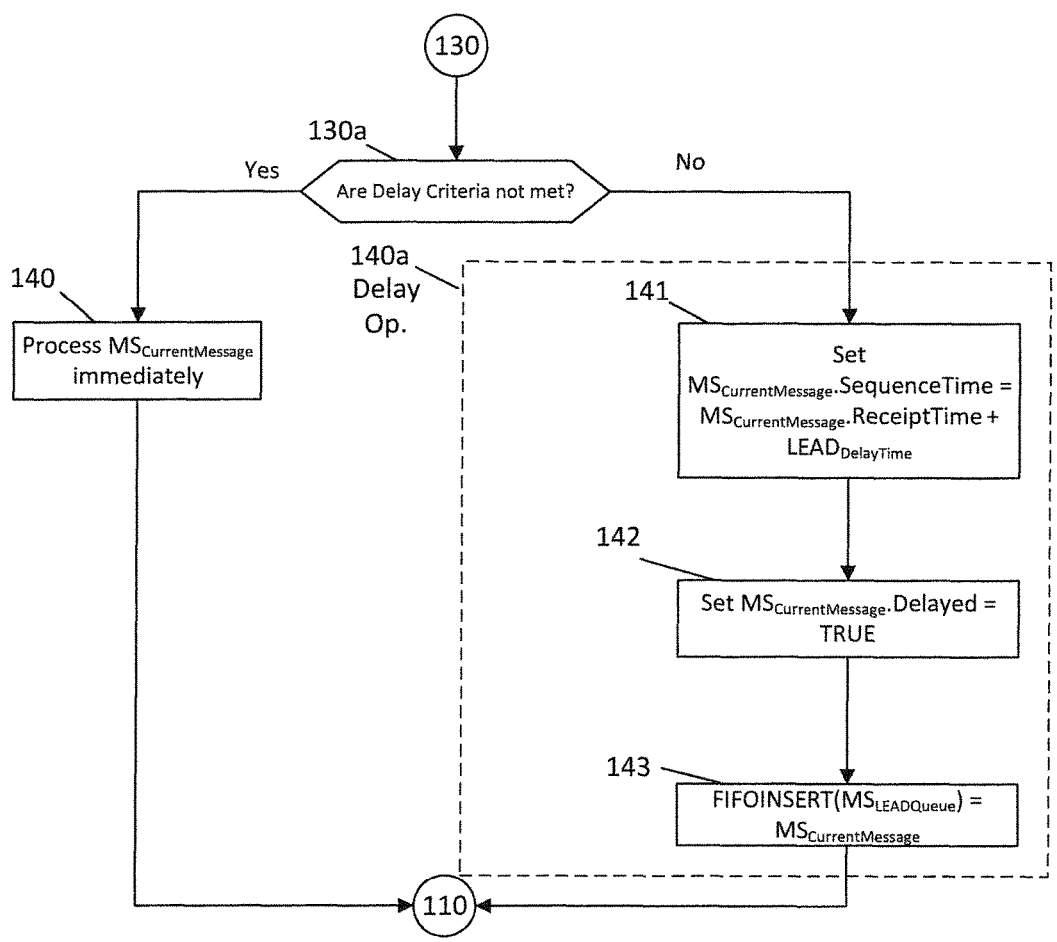
FIG. 3B is a flowchart that shows how a Matching System according to an implementation of the present invention employing an unspecified set of Delay Criteria which determines whether an Inbound Message should be delayed and proceeding to delay such a Message when an intentional delay is required.

FIG. 3B is a flowchart that shows how a Matching System Engine 175 according to an implementation of the invention determines whether an Inbound Message 157 which meets a set of Delay Criteria may be delayed, and proceeds to delay execution of an executable instruction in such a Message 157 when a delay is required. FIG. 3B does not show the specifics of the Delay Criteria (examples of which are illustrated in the following FIGS).

At operation 130, processing begins after the Current Message 172 has been determined. Processing continues at operation 130a.

At operation 130a, the Matching System Engine 175 determines whether the delay criteria have not been meet. For example, of this is where the Current Message 172 has already been delayed in the LEAD Queue 170. A feature according to an implementation is that no Message is moved to the LEAD Queue 170 more than once. This may be determined by use of a Delayed flag discussed above. The value of Delayed may be set to FALSE where each Inbound Message 157 is received and initially sequenced by the Matching System Dispatcher 160 (FIG. 1B, at operation 103). The value of Delayed may be set to TRUE (FIG. 3C, at operation 142) only when the Message is moved to the LEAD Queue 170. Therefore, testing the value of Delayed, for example, by the Matching System Engine 175, may provide an indication as to whether the Current Message 172 has previously been placed in the LEAD Queue 170. If Delayed is TRUE, then the Current Message 172 has already been delayed in the LEAD Queue 172, no further delay is required, and processing continues at operation 140.

In general, if the Delay Criteria have not been met (130a:Yes), then the message/executable instruction is executed immediately 140.

At operation 140, the Matching System Engine 175 does whatever the Current Message 172 requires in the same way that a known Matching System Engine 175 would. When Matching System Engine 175 processing of the Current Message 172 is completed, processing continues at operation 110.

If the Delay Criteria have been met (130a:No), then the delay operations 140a may be performed.

At operation 141, the Matching System Engine 175 has determined that the Current Message 172 should be intentionally delayed by moving it to the LEAD Queue 170. The first operation in this process is to determine when the LEAD Period will end. When the Current Message 172 was received by the Matching System Dispatcher 160 (FIG. 1B, at operation 102), both Message.ReceiptTime and Message.SequenceTime were set to the then current time. The value of Message.SequenceTime determines the first possible time when the Message's 157 LEAD Period will end and the Message 157 can be processed by the Matching System Engine 175 without additional intentional delay. To compute the new value of Message.SequenceTime, the sum of Message.ReceiptTime and the LEAD Delay is calculated (in the example, the receipt time is 00:00.000 and the LEAD Delay is a predetermined fixed time of 20 msec, giving a new Message.SequenceTime of 00:00.020). In the implementation shown, it is assumed that the length of the LEAD Delay is a fixed amount of time (e.g., 20 milliseconds). However, the LEAD Delay can be determined in other manners including, but not limited to: (1) calculating the LEAD Delay based on a frequency at which Messages have been arriving, (2) randomizing the LEAD Delay around a mean value, (3) randomizing the LEAD Delay within a range of values, or (4) other methods. After the Matching System Engine 175 has calculated the new value of Message.SequenceTime for the Current Message 172, processing continues at operation 142.

At operation 142, the Matching System Engine 175 sets of value of Delayed for the Current Message 172 to TRUE. The value of Delayed was initially set to FALSE by the Matching System Dispatcher 160 when the Current Message 172 was first received as a Message 157 (FIG. 1B at operation 103). Setting the Delayed value of the Current Message 172 to TRUE assures that when the Current Message 172 is removed from the LEAD Queue 170 after the Current Message's Message.SequenceTime has been reached or passed (FIG. 2B at operation 121), when the Current Message 172 is evaluated by the Matching System Engine 175 for possible intentional delay (FIG. 3C at operation 131), it will not be intentionally delayed again. Processing continues at operation 143.

At operation 143, the Matching System Engine 175 moves the Current Message 172 to the LEAD Queue 170 using the FIFOINSERT function to assure that all messages in the LEAD Queue are sequenced in the order in which they will become eligible to be removed from the LEAD Queue. This is of critical importance if the LEAD Delay can vary between Messages. By using FIFOINSERT instead of FIFOPUSH to add Messages to the LEAD Queue, FIFOPOP will always locate the next Message in the LEAD Queue which is ripe for immediate processing at the end of its intentional delay. Processing continues at operation 110.

Figure 3C:
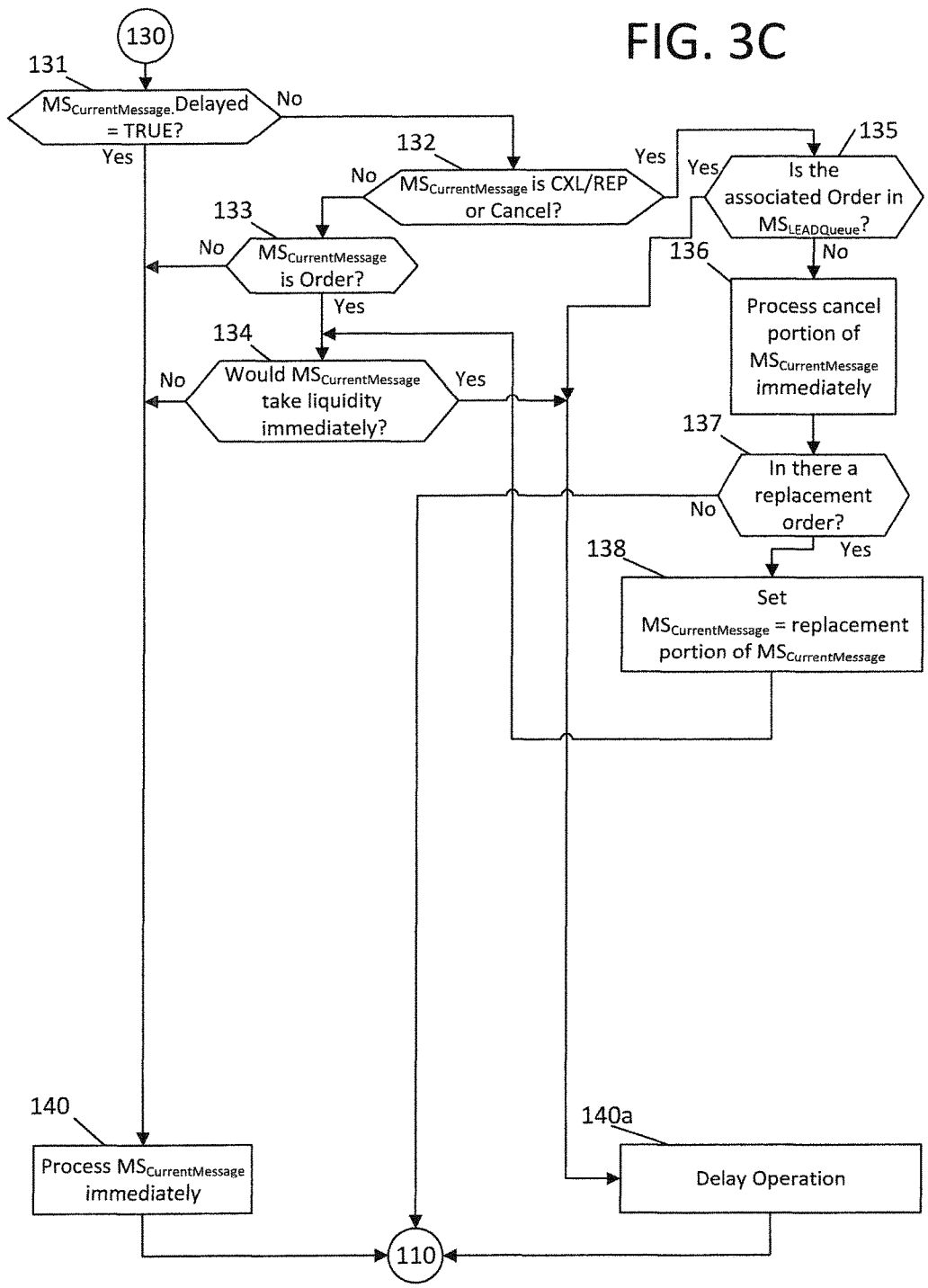
FIG. 3C is a flowchart that shows how a Matching System according to an implementation of the present invention employing one set of Delay Criteria which determines whether an Inbound Message should be delayed and proceeding to delay such a Message when an intentional delay is required.

As can be seen by comparing FIG. 3A and FIG. 3B, the operations required to determine whether the Delay Criteria met have been condensed into a single operation 131 for the purpose of simplifying the presentation. The Delay Criteria determine whether the Current Message 172 should be processed immediately by the Matching System Engine 175 or moved to the LEAD Queue 170. There are also three additional operations that may be provided to move the Current Message 172 to the LEAD Queue 170. These operations are 141, 142, and 143, and may be referred to collectively as a delay operation 140a. These operations (or their logical equivalent) may be employed to achieve the aims discussed herein FIG. 3C is a flowchart that shows how the Matching System Engine 175 according to an implementation of the invention determines whether an Inbound Message 157 should be intentional delayed and proceeding to intentional delay such an Inbound Message 157 when an intentional delay is required. Operations 131-138 comprise an example of the Delay Criteria.

At operation 130, processing begins after the Current Message 172 has been determined. Processing continues at operation 131.

At operation 131, the Matching System Engine 175 determines whether the Current Message 172 has been intentionally delayed. A feature according to an implementation is that no Message is moved to the LEAD Queue 170 more than once. This may be determined by use of a Delayed flag discussed above. The value of Delayed should be set to FALSE where each Inbound Message 157 is received and initially sequenced by the Matching System Dispatcher 160 (FIG. 1B, at operation 103). The value of Delayed is set to TRUE (FIG. 3C, at operation 142) only when the Message is moved to the LEAD Queue 170. Therefore, testing the value of Delayed by the Matching System Engine 175 provides an indication as to whether the Current Message 172 has previously been placed in the LEAD Queue 170. If Delayed is TRUE, then the Current Message 172 has already been intentional delayed in the LEAD Queue 172, no further intentional delay is required, and processing continues at operation 140.

At operation 132, the Matching System Engine 175 has determined that the Current Message 172 has not previously been moved to the LEAD Queue 170 and intentionally delayed. Now the Matching System Engine 175 must determine whether the Current Message 172 should be processed immediately or moved to the LEAD Queue 170 to be intentional delayed. To do this, the Matching System Engine 175 must determine whether immediate and complete processing of the Current Message 172 by the Matching System Engine 175 would result in the Current Message 172 Taking Liquidity. To make this determination, the Matching System Engine 175 first determines whether the Current Message 172 is either a Cancel Request or a Cancel/Replace Request. Either of these Message types involves attempting to cancel an Order (Message) which was previously received. If the Current Message 172 is either a Cancel Request or a Cancel/Replace Request, processing continues at operation 135.

At operation 133, the Matching System Engine 175 determines whether the Current Message 172 is an Order. If the Current Message 172 is not an Order (and was determined at operation 132 not to be a Cancel Request or a Cancel/Replace Request), the Current Message 172 cannot Take Liquidity and should be processed immediately. Therefore, if the Current Message 172 is not an Order, processing continues at operation 140. If the Current Message 172 is an Order, processing continues at operation 134.

At operation 134, the Matching System Engine 175 must determine whether the Current Message 172—which is an Order—would Take Liquidity immediately. If the Order would Take Liquidity immediately, it should be intentionally delayed by moving it to the LEAD Queue 170, and processing continues at the intentional delay operation 140a. If the Order would not Take Liquidity, then the Order would Provide Liquidity, no intentional delay is required, and processing continues at operation 140, which may involve the order being placed in the Resting Order Book 180.

At operation 135, the Matching System Engine 175 has determined that the Current Message 172 is either a Cancel Request or a Cancel/Replace Request. It is important that a Cancel Request or the cancel portion of a Cancel/Replace Request is not processed before the Matching System Engine 175 has received and fully processed the associated Order which is to be cancelled. Therefore, the Cancel Request or Cancel/Replace Request must be directed to wherever the associated Order is currently present. The associated Order is either in the LEAD Queue 170 or it has already been processed by the Matching System Engine 175 at operation 140. Therefore, at operation 135, the Matching System Engine 175 determines whether the associated Order is presently in the LEAD Queue 170. If the associated Order is presently in the LEAD Queue 170, the Current Message 172 must be moved to the LEAD Queue 170 so that it arrives at the Matching System Engine 175 after the associated Order arrives, and processing continues at operation 140a. If the associated Order is not presently in the LEAD Queue 170, the Cancel Request or the cancel portion of the Cancel/Replace Request may be processed immediately, and processing continues at operation 136.

At operation 136, the Matching System Engine 175 immediately processes the Cancel Request or the cancel portion of the Cancel/Replace Request as it would in known Matching Systems. If this processing results in a replacement Order Message, the Matching System Engine 175 determines what the replacement Order Message would be, but it should not process the replacement Order Message at this time. Processing continues at operation 137.

At operation 137, the Matching System Engine 175 determines whether a replacement Order Message has been created. If the Current Message 172 was a Cancel Request, this will never be the case. If the Current Message was a Cancel/Replace Request, there may or may not be a replacement Order Message. If there is no replacement Order Message, then there is nothing left for the Matching System Engine 175 to do regarding the Current Message, and processing continues at operation 110. However, if there is a replacement Order Message, the Matching System Engine 175 processes it as though it were a new Order Message, and processing continues at operation 138.

At operation 138, the Matching System Engine 175 sets the Current Message 172 to be the replacement Order Message. Processing continues at operation 134, which was discussed above and is not repeated here. Processing continues at operation 140.

Operations 140 and 140a have been discussed above.

As can be seen by comparing FIG. 3A and FIG. 3C, there are nine operations provided within the present implementation of the Matching System 150 to deter mine whether the Current Message 172 should be processed immediately by the Matching System Engine 175 or moved to the LEAD Queue 170. These are operations 131,132,133,134,135,136, 137, and 138. There are also three additional operations that may be provided to move the Current Message 172 to the LEAD Queue 170. These operations are 141, 142, and 143 (collectively operations 140a). These operations (or their logical equivalent) may be employed to achieve the aims discussed herein.

Figure 3D:
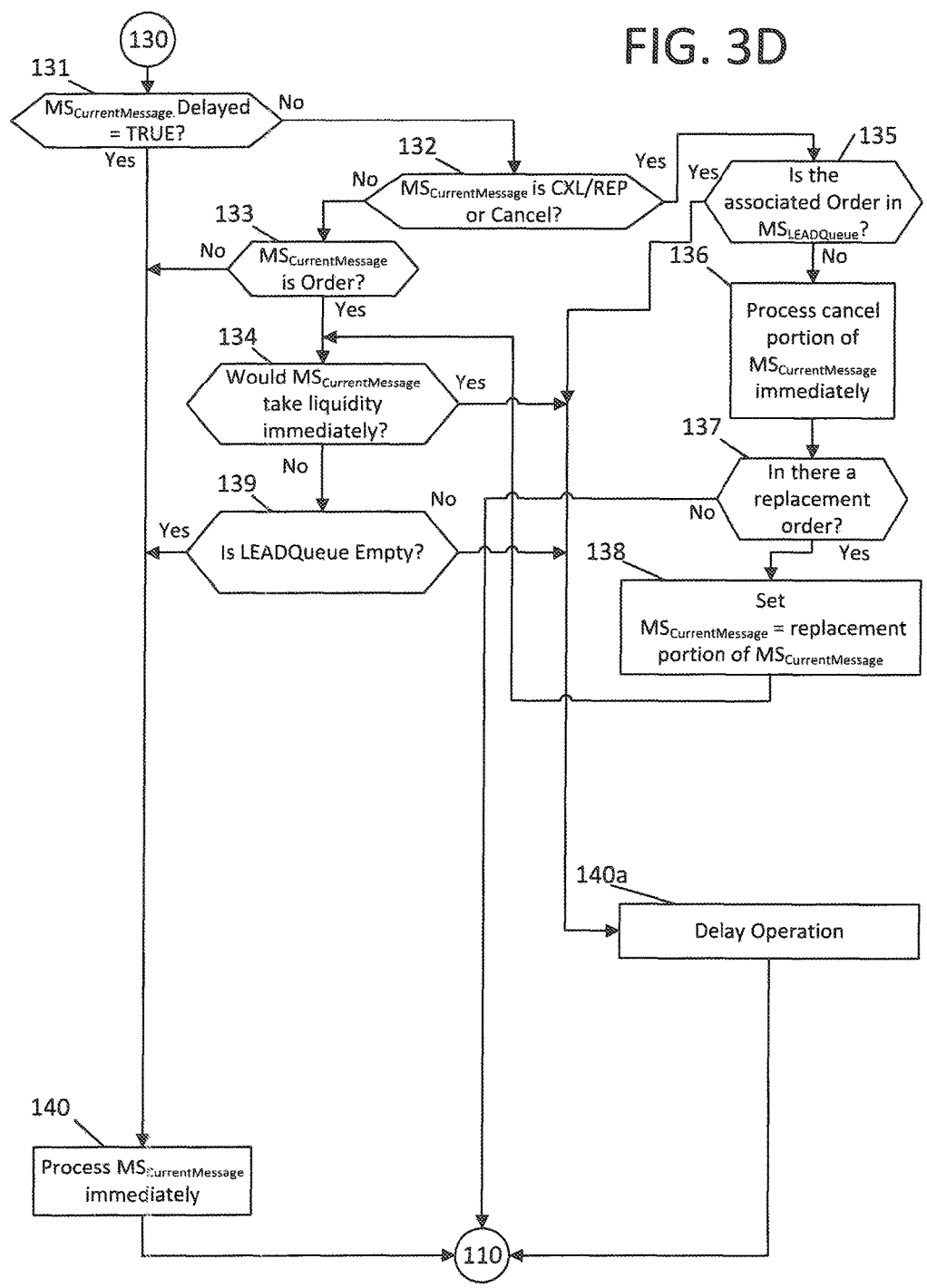
FIG. 3D is a flowchart that shows how a Matching System according to another implementation of the present invention employing a second set of Delay Criteria which determines whether an Inbound Message should be delayed and proceeding to delay such a Message when an intentional delay is required.

FIG. 3D shows an alternate implementation of that shown in FIG. 3C. Operations 131-139 comprise one example of the Delay Criteria.

These two implementations are the same with the following exception. In FIG. 3C, the No branch of operation 134 leads directly to operation 140, which is processing the current message immediately. In the implementation shown in FIG. 3D, the No branch of operation 134 leads to a new test to determine if the LEAD Queue 170 is empty 139. If it is, then processing continues at operation 140 as it did in FIG. 3C. However, if the LEAD Queue 170 is not empty, then it proceeds to operation 140a. The effect of this is that once a Message is processed from the LEAD Queue 170, Order messages continue to be sent to and processed from the LEAD Queue 170 until it is empty. Cancel messages and the cancel portion of a Cancel/Replace messages continue to be processed immediately if the corresponding order is in the Matching System (135:No) or sent to the LEAD Queue with an added intentional delay (135:Yes) if the corresponding Order message is in the LEAD Queue.

When a new order is placed in the LEAD queue solely because the LEAD queue is not empty, the Message.SequenceTime remains the same as the Message.ReceiptTime. Since, in this implementation, the LEAD Queue is a FIFO queue, this assures that messages remain in the same sequence in the LEAD queue relative to each other as the sequence in which they originally arrived. However, when a first message is popped out of the LEAD queue and the next (second) message in the LEAD queue still has its original Message.ReceiptTime, this assures that the second message will be processed next and immediately after the first message with no additional intentional delay. Put another way, once there is something in the LEAD queue, everything but cancels and the cancel portion of a cancel/replace of orders not in the LEAD queue follow the LEAD path to retain their relative sequence.

Figure 3E:
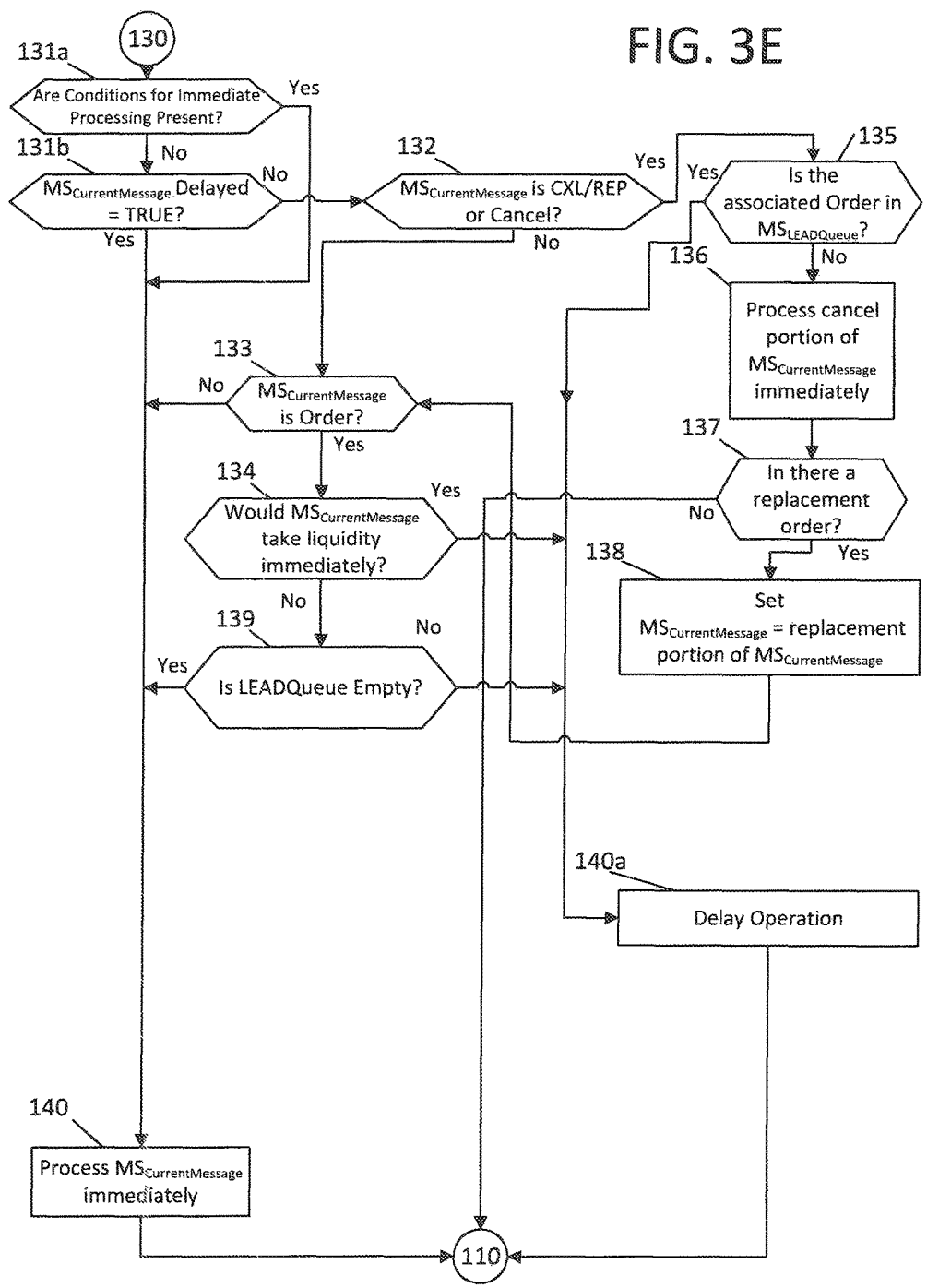
FIG. 3E is a flowchart that shows how a Matching System according to a further implementation of the present invention employing a third set of Delay Criteria which determines whether an Inbound Message should be delayed and proceeding to delay such a Message when an intentional delay is required.

FIG. 3E shows a further implementation of that shown in FIG. 3D. Operations 131-139 comprise one example of the Delay Criteria.

These two implementations are the same with the following exception. In FIG. 3E, the operation 131 is broken down into a two-operation query. At operation 131*a*, a decision is made as to whether the conditions are present for an immediate processing of the current Message. This allows for immediate processing of Orders that would otherwise be intentional delayed because those Orders meet special conditions. If such conditions are present, at operation 131*a*:Yes, the Message is immediately processed at operation 140. Otherwise, if the conditions for immediate processing are not present, at operation 131*a*:No, then the processing as described in FIG. 3D occurs. An implementation according to FIG. 3C (i.e., without operation 139) in which the operation 131 is broken down into a two-operation query is also possible.

Figure 3F:
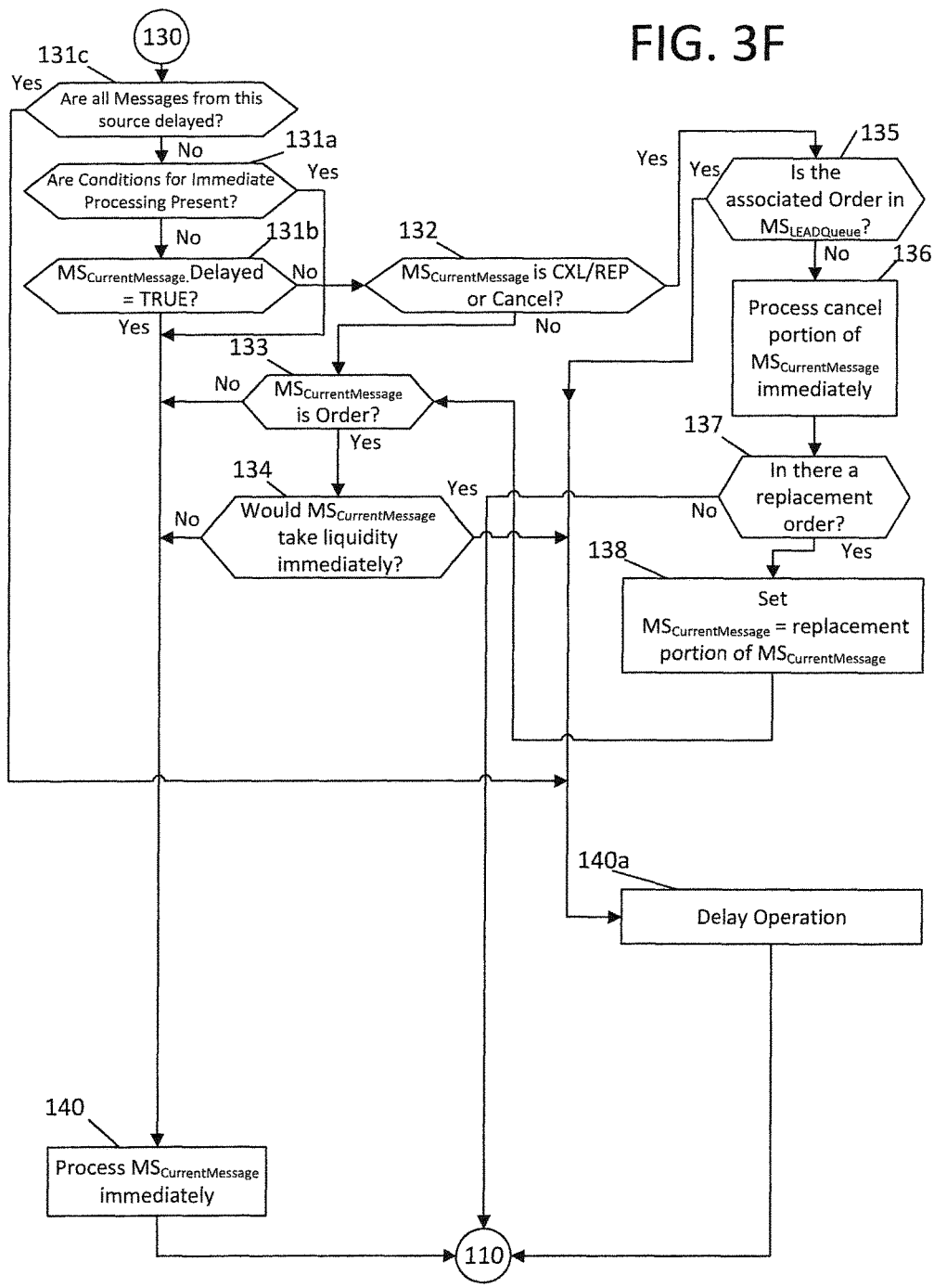
FIG. 3F is a flowchart that shows a further implementation of that shown in FIG. 3D employing a fourth set of Delay Criteria.

FIG. 3F shows a further implementation of that shown in FIG. 3D. Operations 131-139 comprise one example of the Delay Criteria.

These two implementations are the same with the following exceptions. In FIG. 3F, a new operation 131*c* tests whether the Message was sent from a source for which all messages must be intentional delayed. If so, the processing continues at operation 141. Otherwise processing continues as to would have done in FIG. 3E. Furthermore, at operation 134, if the current Message would not take liquidity, then the operation proceeds directly to operation 140, instead of operation 139, as in FIG. 3E.

One operation of the LEAD is to slow down orders that would take liquidity immediately from a Resting Order when, in fact, the Resting Order whose liquidity would be taken is something that the order sender wants to cancel. The LEAD delay gives that order sender a brief period of time to cancel the Resting Order.

The following use case illustrates a circumstance in which an intentional delay may not be desired. In this use case, the best displayed market in the national market system (comprising all displayed bids and offers) is $20.00 bid, $20.05 offered. However, if an exchange holds an undisplayed bid of $20.05, it may not be desirable to intentionally delay an inbound liquidity taking sell order at $20.05 from matching against that undisplayed (hidden) Resting Order to buy at a price of $20.05 because this particular inbound sell order operates to add, not take, liquidity and the seller is clearly not expecting to be matched immediately at the offer price. In contrast, if there is an undisplayed (hidden) Resting Order to sell at the midpoint price (i.e., $20.025), then the risk of unfair latency arbitrage is present and the intentional delay mechanism is utilized.

Another example considers using the 131*a*:Yes branch to send Orders to the Matching System which already direct the Matching System not to execute them immediately. Examples of this include Orders sent to the Matching System prior to a daily opening auction which are marked "Opening Only" or orders sent to the Matching System prior to the daily closing auction which are marked "On Close." These Orders are gathered at the time the Matching System receives them and then placed in a special queue or other storage location for processing at some time in the future when the auction occurs. Such orders are not part of a latency arbitrage strategy because they are inherently delayed by the terms of the Order. Therefore, they should be sent directly to the Matching System without any intentional delay.

The system or systems described herein may be implemented on any form of computer or computers and the components may be implemented as dedicated applications or in client-server architectures, including a web-based architecture, and can include functional programs, codes, and code segments. Any of the computers, as discussed above, may comprise a processor, a memory for storing program data and executing it, a permanent storage such as a disk drive, a communications port for handling communications with external devices, and user interface devices, including a display, keyboard, mouse, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media is readable by the computer, stored in the memory, and executed by the processor.

Figure 5:
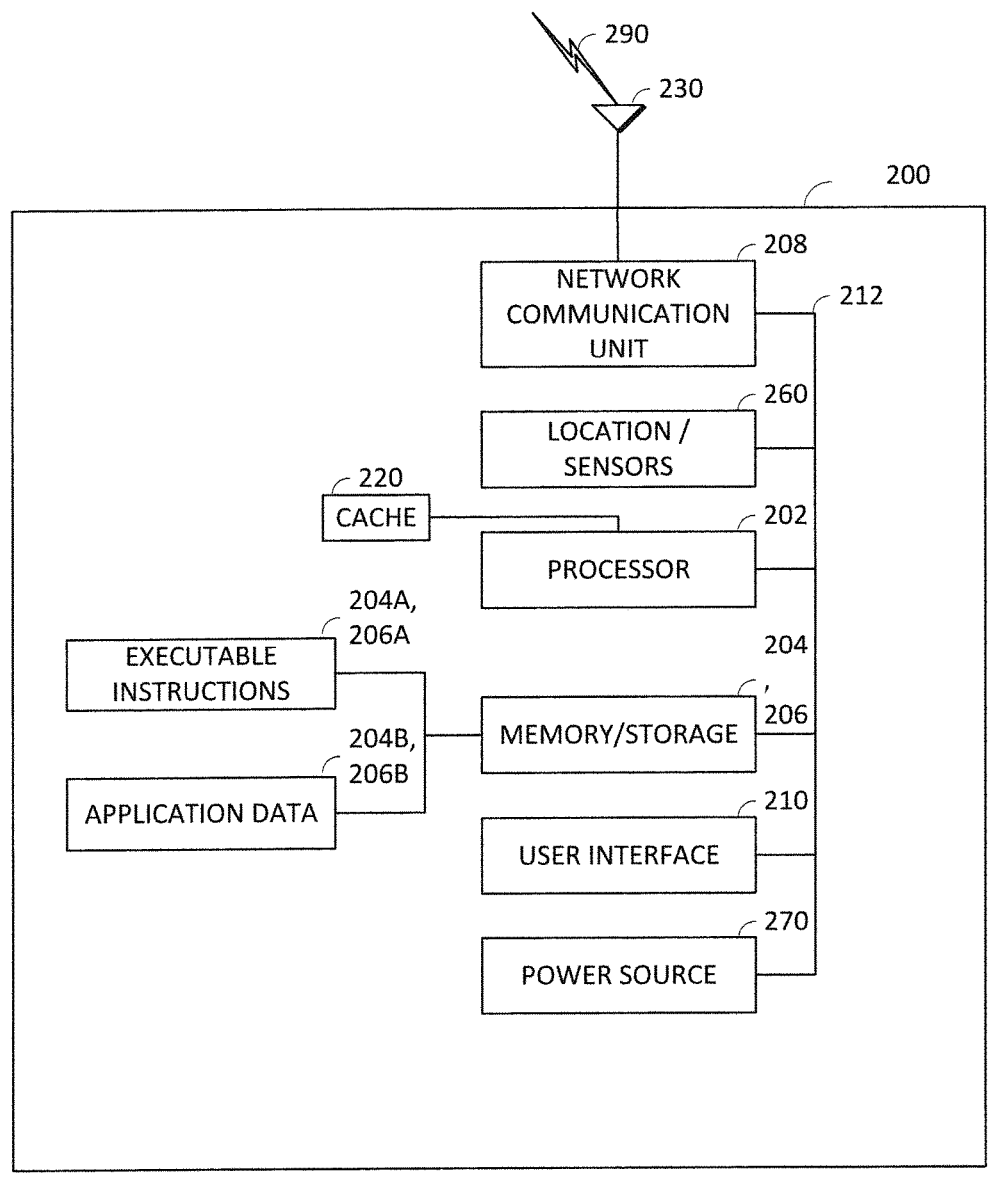
FIG. 5 is a block diagram illustrating components of a typical computer that could be utilized for any of the components illustrated in FIG. 4.

In more detail, FIG. 5 is a block diagram of an implementation of an internal configuration of a computing device 200, including an infrastructure control server of a computing system. As previously described, any of the components of FIG. 4 may take the form of a computing system including multiple computing units, or in the form of a single computing unit, for example, a mobile phone, a tablet computer, a laptop computer, a notebook computer, a desktop computer, a server computer and the like.

The computing device 200 can include a number of components, as illustrated in FIG. 5. Processor 202 can be a central processing unit, such as a microprocessor, and can include single or multiple processors, each having single or multiple processing cores. Alternatively, processor 202 can include another type of device, or multiple devices, capable of manipulating or processing information now-existing or hereafter developed. When multiple processing devices are present, they may be interconnected in any manner, including hardwired or networked, including wirelessly networked. Thus, the operations of processor 202 can be distributed across multiple machines that can be coupled directly or across a local area or other network. The processor 202 can be a general-purpose processor or a special purpose processor, and any general-purpose processor may be considered a special purpose processor when coupled with algorithms containing code designed to execute on the processor.

Random Access Memory (RAM) 204 can be any suitable non-permanent storage device that is used as memory. RAM 204 can include executable instructions and data for access by processor 202. RAM 204 typically comprises one or more DRAM modules such as DDR SDRAM. Alternatively, RAM 204 can include another type of device, or multiple devices, capable of storing data for processing by processor 202 now-existing or hereafter developed. Processor 202 can access and manipulate data in RAM 204 via bus 212. The processor 202 may utilize a cache 220 as a form of localized fast memory for operating on data and instructions.

Storage 206 can be in the form of read only memory (ROM), a disk drive, a solid-state drive, flash memory, Phase-Change Memory (PCM), or any form of non-volatile memory designed to maintain data for some duration of time, and preferably in the event of a power loss. Storage 206 can include executable instructions 206A and application files/data 206B along with other data. The executable instructions 206A can include, for example, an operating system and one or more application programs for loading in whole or part into RAM 204 (with RAM-based executable instructions 204A and application files/data 204B) and to be executed by processor 202. The executable instructions 206A may be organized into programmable modules or algorithms, functional programs, codes, and code segments designed to perform various functions described herein. The operating system can be, for example, a Microsoft Windows®, Mac OS X®, or Linux® operating system, or can be an operating system for a small device, such as a smart phone or tablet device, or a large device, such as a mainframe computer. The application program can include, for example, a web browser, web server and/or database server. Application files 206B can, for example, include user files, database catalogs and configuration information. In an implementation, storage 206 includes instructions to perform the discovery techniques described herein. Storage 206 may comprise one or multiple devices and may utilize one or more types of storage, such as solid state or magnetic.

The computing device 200 can also include one or more input/output devices, such as a network communication unit 208 and interface 230 that may have a wired communication component or a wireless communications component 290, which can be coupled to processor 202 via bus 212. The network communication unit 208 can utilize any of a variety of standardized network protocols, such as Ethernet, TCP/IP, or the like to effect communications between devices. The interface 230 can comprise one or more transceiver(s) that utilize the Ethernet, power line communication (PLC), Wi-Fi, infrared, GPRS/GSM, CDMA, etc.

A user interface 210 can include a display, positional input device (such as a mouse, touchpad, touchscreen, or the like), keyboard, or other forms of user input and output devices. The user interface 210 can be coupled to the processor 202 via the bus 212. Other output devices that permit a user to program or otherwise use the client or server can be provided in addition to or as an alternative to display 210. When the output device is or includes a display, the display can be implemented in various ways, including by a liquid crystal display (LCD) or a cathode-ray tube (CRT) or light emitting diode (LED) display, such as an OLED display.

Other implementations of the internal configuration or architecture of clients and servers 200 are also possible. For example, servers may omit display 210. RAM 204 or storage 206 can be distributed across multiple machines such as network-based memory or memory in multiple machines performing the operations of clients or servers. Although depicted here as a single bus, bus 212 can be composed of multiple buses, that may be connected to each other through various bridges, controllers, and/or adapters. Computing devices 200 may contain any number of sensors and detectors that monitor the computing device 200 itself or the environment around the computing device 200, or it may contain a location identification unit 260, such as a GPS or other type of location device. The computing device 200 may also contain a power source 270, such as a battery, so that the unit can operate in a self-contained manner. These may communicate with the processor 202 via the bus 212.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The embodiments herein may be described in terms of functional block components and various processing operations. Such functional blocks may be realized by any number of hardware and/or software components that perform the specified functions. For example, the described embodiments may employ various integrated circuit components, e.g., memory elements, processing elements, logic elements, look-up tables, and the like, which may carry out a variety of functions under the control of one or more microprocessors or other control devices. Similarly, where the elements of the described embodiments are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the embodiments of the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. Expressions such as "at least one of," when preceding a list of elements, modify the entire list of elements and do not modify the individual elements of the list.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the operations of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention,

The invention claimed is:

1. A method for intentionally delaying an execution of an executable instruction executable by a processor configured to execute programmed instructions stored in non-transitory memory, the method comprising:
   identifying a current executable instruction among one or more executable instructions stored among an inbound message queue and an intentional delay queue;
   determining whether the current executable instruction is received from a predefined source or from at least one other source that is not the predefined source, the predefined source being predefined by the processor prior to receipt of the current executable instruction as a source for which all executable instructions are to be intentionally delayed;
   when it is determined that the current executable instruction is received from the predefined source for which all executable instructions are to be intentionally delayed:
      moving the current executable instruction to the intentional delay queue for execution after a delay time, and marking the current executable instruction with a delay indication; and
   when it is determined that the current executable instruction is received from the at least one other source:
      immediately executing the current executable instruction when the executable instruction includes a condition for immediate processing; and
      further determining whether the current executable instruction has been previously placed in the intentional delay queue based on a presence or absence of the delay indication, and immediately executing the current executable instruction when the delay indication is present.

2. The method of claim 1, further comprising, when it is determined that the delay indication is not present for the current executable instruction:
   determining whether the current executable instruction includes an order;
   when the current executable instruction does not include the order, immediately executing the current executable instruction.

3. The method of claim 2, further comprising, when it is determined that the current executable instruction includes the order:
   determining whether the order would take liquidity immediately;
   when the order would take liquidity immediately, moving the current executable instruction to the intentional delay queue.

4. The method of claim 3, further comprising, when the order would not take liquidity immediately:
   immediately executing the current executable instruction.

5. The method of claim 2, further comprising, when the order comprises a cancel order or a cancel-replace order:
   determining whether there is an order associated with the current executable instruction in the intentional delay queue;
   when the intentional delay queue includes said associated order, moving the current executable instruction to the intentional delay queue.

6. The method of claim 5, further comprising, when the intentional delay queue does not include said associated order:
   immediately processing either the cancel order or a cancel portion of the cancel-replace order.

7. The method of claim 6, further comprising:
   determining whether the cancel-replace order includes a replacement portion;
   setting the current executable instruction as the replacement portion responsive to said determination; and
   repeating said determination of whether the current executable instruction is an order.

8. The method of claim 1, further comprising:
   determining whether the intentional delay queue is empty;
   when it is determined that the intentional delay queue is not empty:
   determining whether a sequence time of an executable instruction within the intentional delay queue has been reached;
   when said sequence time has not been reached and when an inbound message queue is not empty, setting the current executable instruction as being a first executable instruction within the inbound message queue, wherein the inbound message queue comprises a first-in-first-out (FIFO) queue;
   when said sequence time has been reached or exceeded:
      when the inbound message queue is empty, setting the current executable instruction as being a first executable instruction within the intentional delay queue, wherein the intentional delay queue comprises a FIFO queue;
      when the inbound message queue is not empty, determining whether a first message sequence time of the intentional delay queue is less than or equal to a second message sequence time of the inbound message queue;

when the first message sequence time is less than or equal to the second message sequence time, then setting a current message as being the first executable instruction within the intentional delay queue, and when the first message sequence time is greater than the second message sequence time, setting the current message as being the first executable instruction within the inbound message queue.

9. The method of claim 1, further comprising:

receiving a message containing the executable instruction at an input port associated with the processor;

setting an executable instruction receipt time of the executable instruction and an executable instruction sequence time of the executable instruction as being a time that the message was received at the input port; and moving the executable instruction with its receipt time and sequence time into the inbound message queue.

10. The method of claim 9, further comprising:

prior to moving the executable instruction into the inbound message queue, setting an intentional delay flag indicating that the executable instruction has not yet been placed in the intentional delay queue.

11. The method of claim 1, further comprising, when it is determined that the current executable instruction is received from the predefined source:

setting a sequence time of the current executable instruction equal to a value comprising a receipt time of the current executable instruction delayed by the delay time.

12. A system for intentionally delaying an execution of an executable instruction, comprising:

a processor configured to execute programmed instructions stored in non-transitory memory;

an input at which one or more executable instructions are received;

an inbound message queue configured to hold at least one executable instruction among the one or more executable instructions;

an intentional delay queue configured to hold other executable instructions among the one or more executable instructions;

the processor being further configured to execute programmed instructions to:

identify a current executable instruction among the one or more executable instructions stored among the inbound message queue and the intentional delay queue;

determine whether the current executable instruction is received from a predefined source or from at least one other source that is not the predefined source, the predefined source being predefined by the processor prior to receipt of the current executable instruction as a source for which all executable instructions are to be intentionally delayed;

when it is determined that the current executable instruction is received from the predefined source for which all executable instructions are to be intentionally delayed:

move the current executable instruction to the intentional delay queue for execution after a delay time, and mark the current executable instruction with a delay indication; and when it is determined that the current executable instruction is received from the at least one other source:

immediately execute the current executable instruction when the executable instruction includes a condition for immediate processing; and further determine whether the current executable instruction has been previously placed in the intentional delay queue based on a presence or absence of the delay indication, and immediately execute the current executable instruction when the delay indication is present.

13. The system of claim 12, wherein the processor is further configured to execute programmed instructions to, when it is determined that the delay indication is not present for the current executable instruction:

determine whether the current executable instruction includes either a cancel order or a cancel-replace order;

when the current executable instruction is neither a cancel order nor a cancel-replace order;

determine whether the current executable instruction includes an order other than the cancel order or the cancel-replace order;

when the current executable instruction does not include the order, immediately execute the current executable instruction.

14. The system of claim 13, wherein the processor is further configured to execute programmed instructions to, when the current executable instruction includes the order:

determine whether the order would take liquidity immediately;

when the order would take liquidity immediately, move the current executable instruction to the intentional delay queue.

15. The system of claim 12, wherein the processor is further configured to execute programmed instructions to, when it is determined that the current executable instruction is received from the predefined source:

set a sequence time of the current executable instruction equal to a value comprising a receipt time of the current executable instruction delayed by the delay time.

16. A method for intentionally delaying an execution of an executable instruction executable by a processor configured to execute programmed instructions stored in non-transitory memory, the method comprising:

identifying a current executable instruction among one or more executable instructions stored among an inbound message queue and an intentional delay queue;

determining whether the current executable instruction matches at least one predetermined condition for intentionally delayed processing, the at least one condition comprising the current executable instructions including an order that would immediately be matched against another order;

when it is determined that the current executable instruction matches the at least predetermined condition:

moving the current executable instruction to the intentional delay queue for execution after a delay time, and marking the current executable instruction with a delay indication; and when it is determined that the current executable instruction does not match the at least one predetermined condition:

immediately execute the current executable instruction when the executable instruction includes a condition for immediate processing; and further determining whether the current executable instruction has been previously placed in the intentional delay queue based on a presence or absence of the delay indication, and immediately executing the current executable instruction when the delay indication is present.

17. The method of claim 16, wherein the at least one predetermined condition further comprises the current executable instruction being received from a predefined source for which all executable instructions are to be intentionally delayed.

18. The method of claim 16, further comprising, when it is determined that the current executable instruction matches the least one predetermined condition:
setting a sequence time of the current executable instruction equal to a value comprising a receipt time of the current executable instruction delayed by the delay time.

19. A system for intentionally delaying an execution of an executable instruction, comprising:
a processor configured to execute programmed instructions stored in non-transitory memory;
an input at which one or more executable instructions are received;
an inbound message queue configured to hold at least one executable instruction among the one or more executable instructions;
an intentional delay queue configured to hold other executable instructions among the one or more executable instructions;
the processor being further configured to execute programmed instructions to:
identify a current executable instruction among the one or more executable instructions stored among the inbound message queue and the intentional delay queue;
determine whether the current executable instruction matches at least one predetermined condition for intentionally delayed processing, the at least one condition comprising the current executable instructions including an order that would immediately be matched against another order;
when it is determined that the current executable instruction matches the at least one predetermined condition:
move the current executable instruction to the intentional delay queue for execution after a delay time, and mark the current executable instruction with a delay indication; and
when it is determined that the current executable instruction does not match the at least one predetermined condition:
immediately execute the current executable instruction when the executable instruction includes a condition for immediate processing; and
further determine whether the current executable instruction has been previously placed in the intentional delay queue based on a presence or absence of the delay indication, and immediately execute the current executable instruction when the delay indication is present.

20. The system of claim 19, wherein the at least one predetermined condition further comprises the current executable instruction being received from a predefined source for which all executable instructions are to be intentionally delayed.

21. The system of claim 19, wherein the processor is further configured to execute programmed instructions to, when it is determined that the current executable instruction is received from the predefined source:
set a sequence time of the current executable instruction equal to a value comprising a receipt time of the current executable instruction delayed by the delay time.

* * * * *